(12) United States Patent
Seo

(10) Patent No.: US 11,347,258 B1
(45) Date of Patent: May 31, 2022

(54) COMPUTING DEVICE AND DRIVING METHOD THEREOF

(71) Applicant: Byeong Chan Seo, Seoul (KR)

(72) Inventor: Byeong Chan Seo, Seoul (KR)

( * ) Notice: Subject to any disclaimer, the term of this patent is extended or adjusted under 35 U.S.C. 154(b) by 0 days.

(21) Appl. No.: 17/667,572

(22) Filed: Feb. 9, 2022

(30) Foreign Application Priority Data

Jun. 7, 2021 (KR) .......................... 10-2021-0073459

(51) Int. Cl.
*G06F 1/06* (2006.01)
*G05F 1/56* (2006.01)
*H02M 1/00* (2006.01)

(52) U.S. Cl.
CPC .................. *G06F 1/06* (2013.01); *G05F 1/56* (2013.01); *H02M 1/0045* (2021.05)

(58) Field of Classification Search
None
See application file for complete search history.

(56) References Cited

U.S. PATENT DOCUMENTS 9,348,407 B2 * 5/2016 Conrad ................. G06F 1/3296
10,097,091 B1 * 10/2018 Huang ................ H02M 3/1582

FOREIGN PATENT DOCUMENTS

| KR | 10-1991-0008534 A | 5/1991 |
| KR | 10-2001-0099880 A | 11/2001 |
| KR | 10-0450375 B1 | 10/2004 |
| KR | 10-1052284 B1 | 7/2011 |
| KR | 10-1481162 B1 | 1/2015 |

OTHER PUBLICATIONS

"Femto clock for OPPO 205", Internet blog, https://pcaudio tistory.com/551, publication date Mar. 13, 2018.
"SDI HSMC" Terasic, https:/ / www terasic.com (publication date Jul. 2009).
"Mytek Manhattan II DAC", Internet blog, https://blog naver.com/kimkwmy/221472791480 (publication date Feb. 23, 2019).

* cited by examiner

*Primary Examiner* — Jeffery S Zweizig
(74) *Attorney, Agent, or Firm* — Revolution IP, PLLC

(57) ABSTRACT

A computing device and a driving method thereof are provided. The computing device is a computing device having a main board with a plurality of elements, and includes a linear regulator unit including a plurality of linear regulators configured to convert a voltage from a power supply into different voltages required for the plurality of elements and apply the different voltages, and a femto-clock generation unit including a plurality of femto-clock generators configured to generate femto-clocks of different frequencies to be used for control of operations of the plurality of elements.

6 Claims, 4 Drawing Sheets

(a)

(b)

COMPUTING DEVICE AND DRIVING METHOD THEREOF

BACKGROUND

1. Field of the Invention

The present disclosure relates to a computing device and a driving method thereof, and more particularly, to a computing device in which ultra-low noise occurs and use of ultra-precision clocks is permitted for a music server for audio streaming or the like and a driving method of the computing device, because much noise occurs and low-quality clocks are used in existing computing devices such as computers or servers and thus the existing computing devices cannot be used in places requiring high sound quality, high resolution, and high precision.

2. Discussion of Related Art

Mainboards, motherboards (or mobos), main circuit boards, base boards, planar boards or system boards are types of boards including a main circuit therein and are employed in electronic devices such as computers and elevators. Such a board is a main component of a scalable electronic device such as a computer and is an electronic board in which circuits for integration and connection of various types of cables or wires and an input/output port are installed. Such a board may be a printed circuit board (PCB) on which main components such as a central processing unit (CPU) or a random access memory (RAM) are mounted to operate a system and which provides an interface for connection to peripheral devices. A board installed in Apple's Macintosh or iPhone is called a logic board.

In a motherboard for a PC, a sound card and a network card are generally included and a CPU, a RAM, and a storage device may be further included according to a purpose.

A general-purpose board for a computer is a general type of manufactured board in which most major parts of a desktop computer can be used, and is also referred to as a main board. A special-purpose board is a board manufactured for a special purpose and has a stand-alone structure unlike a general-purpose board. Such a main board is used in notebook computers, game consoles, mobile phones, etc.

However, with the recent growing demand for music servers that reflect changes and the pursuit of convenience in digital music playback media (e.g., Compact Disc/Digital Versatile Disc (CD/DVD)→digital string play), achieving of high resolution, high sound quality, high-precision control, etc. is very limited in the case of existing audio/video (A/V) servers for audio streaming, medical computers, military computers, and various types of computers for high-precision control (e.g., three-dimensional (3D) printing).

In other words, when an existing computer is used in such an environment, much noise may occur and the quality of a clock may be degraded.

SUMMARY OF THE INVENTION

Embodiments of the present disclosure are directed to providing a computing device in which ultra-low noise occurs and use of ultra-precision clocks is permitted for a music server for audio streaming, and a driving method of the computing device, because much noise occurs and low-quality clocks are used in existing computing devices such as computers or servers and thus the existing computing devices cannot be used in places requiring high sound quality, high resolution, and high precision.

An embodiment of the present disclosure provides a computing device with a main board including a plurality of elements, the computing device including: a linear regulator unit including a plurality of linear regulators configured to convert a voltage from a power supply into different voltages required for the plurality of elements and apply the different voltages; and a femto-clock generation unit including a plurality of femto-clock generators configured to generate femto-clocks of different frequencies to be used for control of operations of the plurality of elements.

The computing device may not include a fan having a heat dissipation function due to the plurality of linear regulators and the plurality of femto-clock generators.

The plurality of linear regulators may be connected in series on the main board to sequentially reduce a voltage supplied from the power supply from one side to another side and provide resultant voltages to the plurality of elements.

The number of the plurality of femto-clock generators may be equal to the number of the plurality of elements, and each of the plurality of femto-clock generators may be operated while connected to one of the plurality of elements.

The plurality of femto-clock generators may generate clocks of different frequencies that are in a frequency range of less than 100 MHz.

The plurality of femto-clock generators may be connected to a processor on the main board, and the processor may control the operations of the plurality of elements using the femto-clocks generated by the plurality of femto-clock generators.

A embodiment of the present disclosure provides a driving method of a computing device with a main board including a plurality of elements, the driving method including: converting, by a linear regulator unit with a plurality of linear regulators, a voltage supplied from a power supply into different voltages required for the plurality of elements and providing the different voltages to the plurality of elements; and generating, by a femto-clock generation unit with a plurality of femto-clock generators, femto-clocks of different frequencies to be used for control of operations of the plurality of elements.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
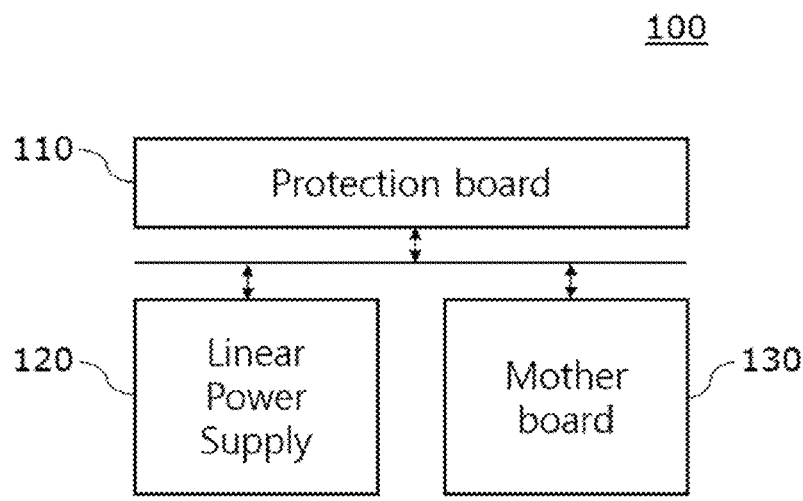
FIG. 1 is a diagram illustrating a structure of a computing device according to an embodiment of the present disclosure.

Descriptions of specific structures or functions of embodiments of the present disclosure are provided to merely describe embodiments of the present disclosure, and embodiments according to the present disclosure may be implemented in various forms and should not be understood as being limited to embodiments described in the present specification or application.

Various modifications may be made in embodiments according to the present disclosure and these embodiments may be implemented in various forms, and thus certain embodiments are illustrated in the drawings and described in detail in the present specification or application. However, it should be understood that the present disclosure is not limited to particular embodiments and includes all modifications, equivalents, and alternatives falling within the idea and scope of the present disclosure.

Terms such as first, second, etc. may be used to describe various components but the components are not limited by the terms. These terms are only used to distinguish one component from another component. For example, a first component could be termed a second component without departing from the scope of the present disclosure, and similarly, a second component could be termed a first component.

When a component is referred to as being "coupled" or "connected" to another component, it should be understood that the component may be directly coupled or connected to the other component but another component may be interposed therebetween. In contrast, when a component is referred to as being "directly coupled" or "directly connected" to another component, it should be understood that no component is interposed therebetween. Other expressions that describe a relationship between components, i.e., "between," "immediately between," "neighboring," "immediately neighboring to," etc. should be understood similarly.

The terms used herein are only used to describe certain embodiments and are not intended to limit the present disclosure. As used herein, the singular expressions are intended to include plural forms as well, unless the context clearly dictates otherwise. It should be understood that the terms "comprise" and/or "comprising," when used herein, specify the presence of stated features, integers, steps, operations, elements, components, or a combination thereof, but do not preclude the presence or addition of one or more other features, integers, steps, operations, elements, components, or a combination thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted with ideal or excessively formal meanings unless explicitly defined herein.

Hereinafter, the present disclosure will be described in detail by describing embodiments thereof with reference to the accompanying drawings. The same reference numerals shown in each drawing represent the same elements.

Figure 2:
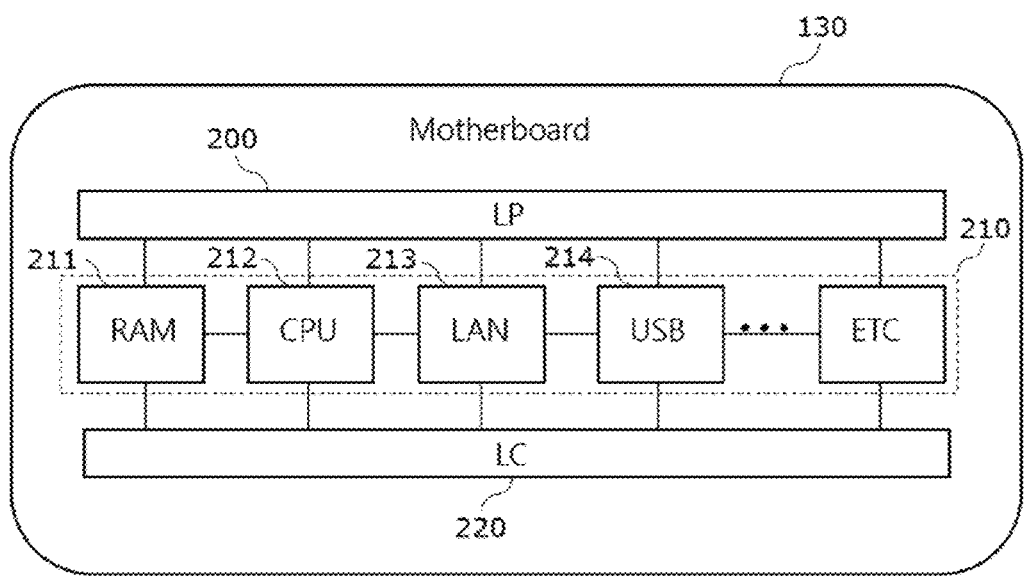
FIG. 2 is a block diagram illustrating an example of a detailed structure of a motherboard of FIG. 1.

FIG. 1 is a diagram illustrating a structure of a computing device according to an embodiment of the present disclosure. FIG. 2 is a block diagram illustrating an example of a detailed structure of a motherboard of FIG. 1.

As shown in FIG. 1, a computing device 100 according to the embodiment of the present disclosure is a computing device used in, for example, an audio/video (A/V) server for audio streaming, a medical computer, a military computer requiring precise signal processing, or a computer requiring any of various types of precise control, such as three-dimensional (3D) printing, and includes some or all of a protection circuit unit 110, a voltage supply 120, and a motherboard 130.

Here, "includes some or all of the protection circuit unit 110, the voltage supply 120, and the motherboard 130" may be understood to mean that part of the computing device 100, such as the protection circuit unit 110 or the voltage supply 120, may be omitted or integrated with another component such as the motherboard 130, but in order to assist with understanding of the present disclosure, it will be described herein that the computing device 100 includes all of the protection circuit unit 110, the voltage supply 120, and the motherboard 130.

The protection circuit unit 110 may perform an operation to prevent electromagnetic interference of various types of electronic components on the motherboard 130 of the computing device 100, and perform an operation to prevent problems such as over power, an overcurrent, and an overvoltage from occurring in the voltage supply 120, i.e., a linear power supply according to an embodiment of the present disclosure, or protect a product or circuit when such a problem occurs. A representative example of the operations may be an automatic or temporary power shut-off function. The protection circuit unit 110 may be configured in various forms and thus is not limited to any form in embodiments of the present disclosure.

The voltage supply 120 supplies operating power or a power supply voltage Vcc to, for example, various types of elements in the form of an integrated circuit (IC), such as a central processing unit (CPU), a random access memory (RAM), or a local area network (LAN) on the main board 130. The amounts of power required for these elements are different from each other. Thus, the voltage supply 120 is configured to generate various voltages to be used. In an embodiment of the present disclosure, effects of high sound quality, high precision, etc. are required and it is important to prevent noise from being delivered when power is supplied to each component. Accordingly, the voltage supply 120 according to an embodiment of the present disclosure may be operated while connected to linear regulators configured on the main board 130.

The voltage supply 120 generally receives commercial power of 220 V and converts the commercial power into a direct current (DC) voltage of a predetermined level. To this end, the voltage supply 120 may include a DC-DC converter in addition to a rectifier, a smoothing circuit, and the like. Accordingly, it possible to generate and provide a highest voltage among power supply voltages of the elements on the main board 130. For example, when the highest voltage is DC 5 V, a voltage of 5 V may be generated and provided. Alternatively, the voltage supply 120 according to an embodiment of the present disclosure may generate and provide various voltages while connected in parallel with regulators, and thus is not limited to only one form.

The motherboard 130 may be referred to as a main board, a main circuit or the like. The motherboard 130 may be a printed circuit board (PCB) for forming a main circuit of a CPU or a microprocessor unit (MPU) for operating the computing device 100, a graphics processing unit (GPU), or the like. Alternatively, the motherboard 130 may further include peripheral circuits such as a communication module or a memory. FIG. 2 illustrates a case in which a (linear) regulator unit 200, a plurality of elements 211 to 214 such as integrated circuit (IC) chips, and a (femto) clock generator 220 are configured on a main substrate.

Referring to FIG. 2, the regulator unit 200 may be connected to the voltage supply 120 of FIG. 1 to receive a voltage. The regulator unit 200 may include a plurality of regulators for supplying different voltages, e.g., 5 V, 3.3 V, 1.2 V, etc., to a RAM 211, a CPU 213, etc. More specifically, linear regulators may be configured to correspond to all elements requiring a power supply voltage.

Therefore, the power supply voltage may be provided after being converted into a voltage with ultra-low noise (e.g., <1 mV), which is required for each element, e.g., each chip. For example, in the case of a switched mode power supply (SMPS) regulator, much noise may occur during a switching operation of a switching element and be delivered to devices, i.e., elements, which are connected thereto, and thus, in an embodiment of the present disclosure, the SMPS regulator is not preferable and a linear regulator may be used.

The linear regulator employs a voltage dropping method, i.e., a method of directly dropping a voltage, and may be a type of DC-DC converter. In an embodiment of the present disclosure, a linear regulator that is relatively simple and in which low noise occurs is used. The plurality of linear regulators may be connected in series to receive a voltage used in a preceding linear regulator and drop the voltage. Therefore, ultra-low noise may be achieved and thus noise may be reduced by a factor of 100 more when compared to, for example, in a computer employing an SMPS, thereby minimizing an effect on an external apparatus, and thus the linear regulator can be advantageously used in processing sensitive signals for audio, medical, military, and precision control purposes. In an embodiment of the present disclosure, the linear regulator may be very useful for a music server or the like. The linear regulator will be described in more detail below.

The plurality of elements 211 to 214 may include various types of elements configured in the form of an IC chip on the main substrate of the main board 130. Each of the plurality of elements 211 to 214 may request the power supply voltage Vcc or a bias voltage for an operation thereof and thus may be supplied with a low-noise voltage from the linear regulator and perform a precision operation that generates low noise.

The main board 130 includes a processor such as the CPU 212, an MPU, or a GPU for control of overall operations of the RAM 211, the LAN 213, and a Universal Serial Bus (USB) 214. For example, the CPU 212 may temporarily store data provided through the LAN 213, the USB 214, etc. in the RAM 211, and read and process the data. The CPU 212 may also perform a control operation to provide the elements 211 to 214 with a voltage provided through the regulator unit 200. In addition, the CPU 212, i.e., a controller, may use a clock signal generated by the clock generator 220 to synchronize the elements 211 to 214. In other words, the generated clock signal may be used to synchronize the elements 211 to 214.

The main board 130 may further include the clock generator 220 to generate a clock. The clock generator 220 generates femto-clocks for generating an ultra-precision clock according to an embodiment of the present disclosure. A clock generator that generates such a clock may include an oscillator. A femto-clock may be understood as having a frequency of 500 MHz or less but in an embodiment of the present disclosure, different frequencies may be used in a frequency range of 100 MHz or less. The clock generator 220 may use a precise clock that is more accurate at least 1000 times or more than, for example, a crystal clock, thereby achieving high resolution, high sound quality, high-precision control, etc. A clock generated by the clock generator 220 may be used to control operations of the elements 211 to 214 and thus the clock generator 220 may generate clocks of various frequencies. To this end, clock generators or oscillators, the number of which is the same as that of the plurality of elements 211 to 214, may be provided. Alternatively, in an embodiment of the present disclosure, a clock generator may be implemented in a linear form to sequentially convert a high-frequency clock into low-frequency clocks to be used. A frequency multiplier is configured to double or triple a frequency, but may be used to increase or decrease a frequency. The clock generator will be described in more detail below.

Due to the above configuration, according to an embodiment of the present disclosure, a higher quality clock having a small jitter delay, than, for example, a crystal clock, may be supplied to or used for the elements 212 to 214, thereby enabling ultra-precision control of devices.

In an embodiment of the present disclosure, in the computing device 100 of FIG. 1, linear regulators are configured to correspond to the elements 212 to 214, and thus a device such as a cooler may not be needed to reduce heat in a regulator or the like. Generally, a linear regulator may include a heat sink plate to reduce heat, and in the related art, a fan is provided to discharge heat to the outside. However, such a component may not be needed.

Figure 3:
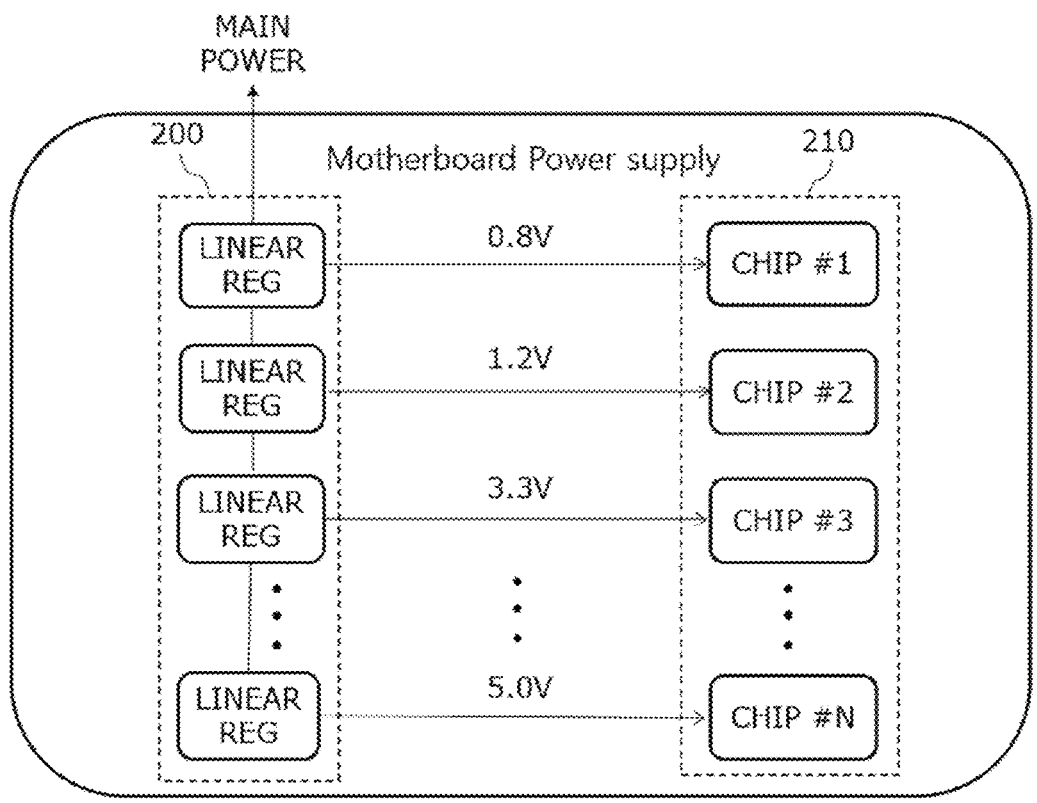
FIG. 3 is a diagram illustrating an example of a detailed structure of a regulator unit of FIG. 2.
Figure 4:
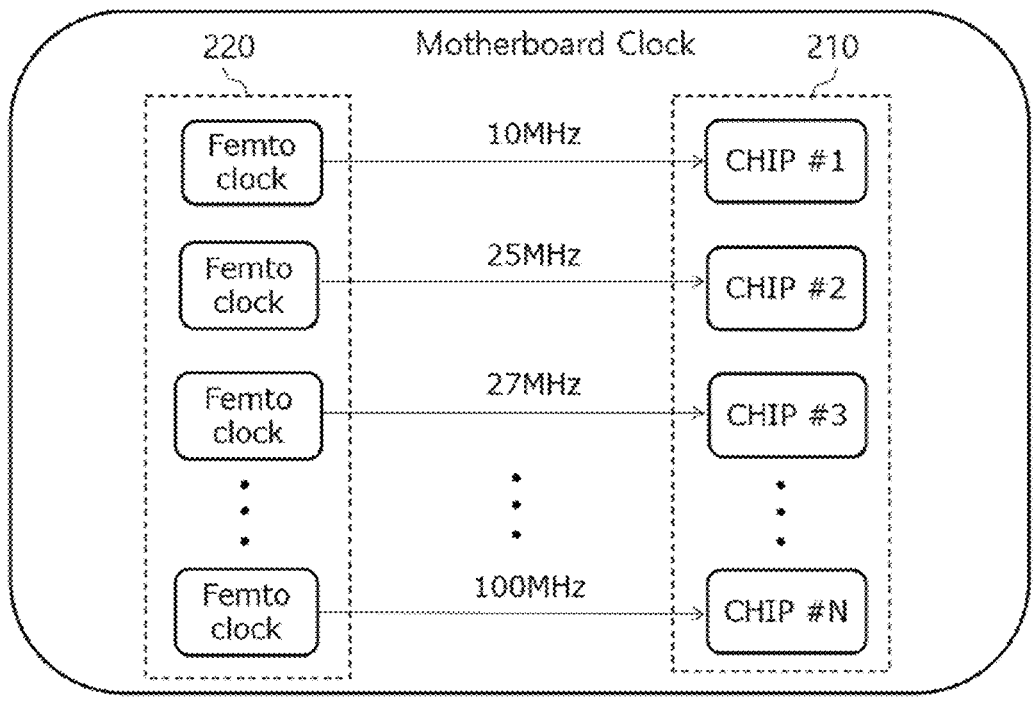
FIG. 4 is a diagram illustrating an example of a detailed structure of a clock generator of FIG. 2.
Figure 5:
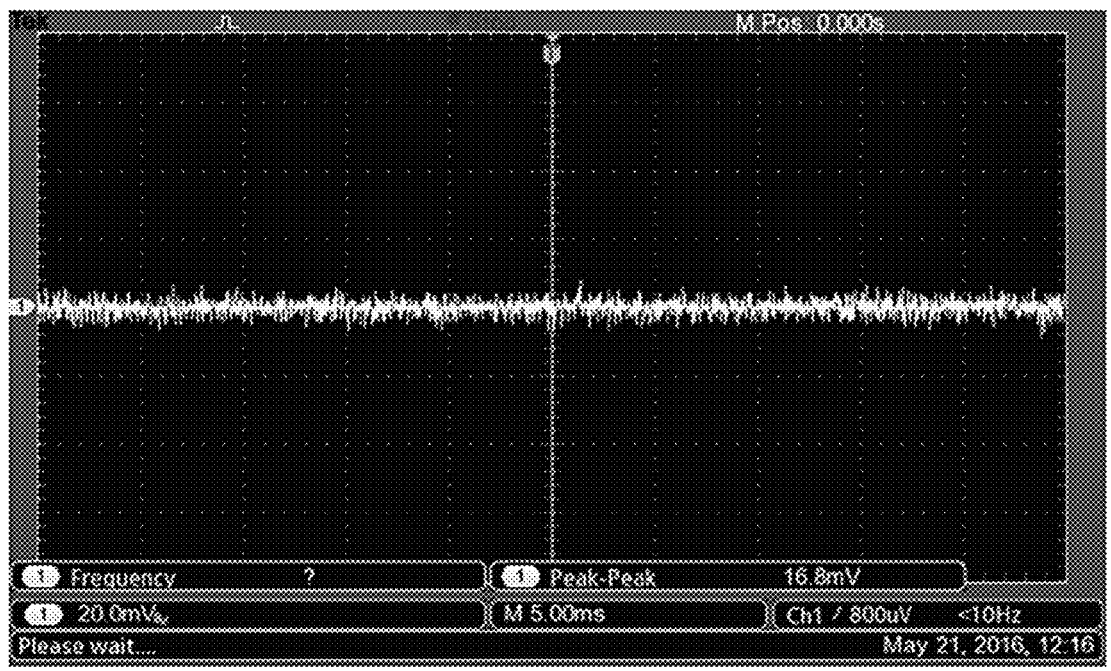
FIG. 5 is a diagram for describing improvement of voltage noise and jitter in the related art.
Figure 5:
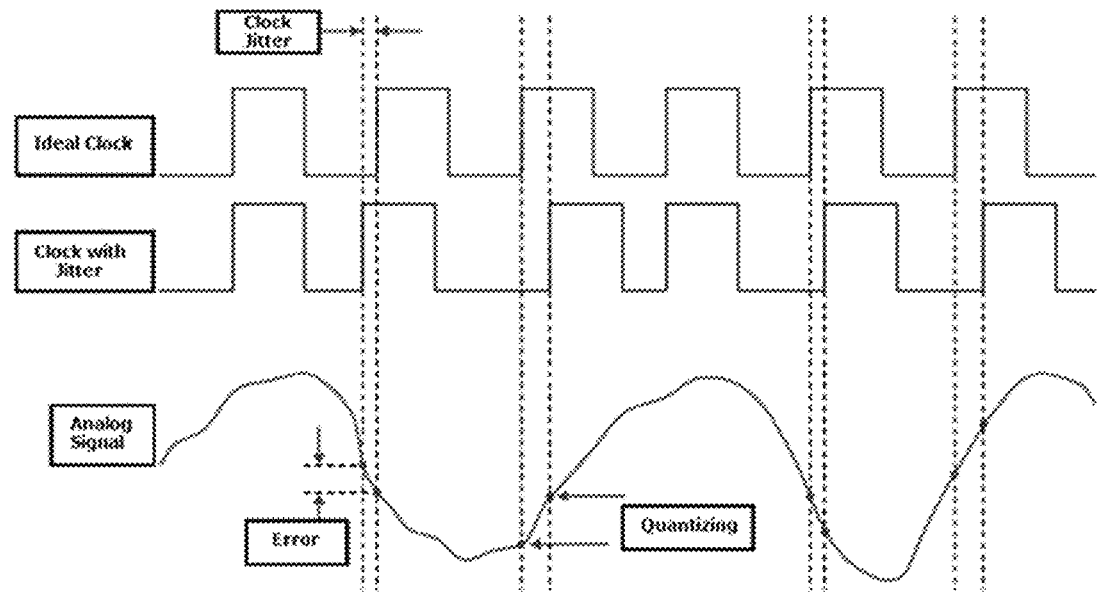

FIG. 3 is a diagram illustrating an example of a detailed structure of the regulator unit of FIG. 2. FIG. 4 is a diagram illustrating an example of a detailed structure of the clock generator of FIG. 2. FIG. 5 is a diagram for describing improvement of voltage noise and jitter in the related art.

Referring to FIG. 3, the regulator unit 200 of FIG. 2 includes a plurality of linear regulators, and the plurality of linear regulators are each connected to one of elements 211 to 214 of an element unit 210.

The plurality of linear regulators are connected in series to one another such that they are configured in a linear form, i.e., in a line. Due to the above configuration, a first linear regulator receiving a highest voltage from the voltage supply 120 stabilizes the highest voltage, i.e., removes noise from the highest voltage, and supplies the stabilized voltage to an element CHIP #N connected to the first linear regulator, or a second linear regulator connected to the first linear regulator drops a voltage of the first linear regulator and supplies a stabilized voltage to an element CHIP #3 connected to the second linear regulator. In an embodiment of the present disclosure, a noise-free voltage may be generated and provided without removing noise from a voltage. As described above, when the plurality of linear regulators are configured in a linear form, it may be useful in reducing power consumption or heat generation that occurs during a voltage drop. For example, the amounts of energy, i.e., power consumption rates, when a voltage of 5 V is dropped to 3.3 V and when the voltage of 5 V is dropped to directly to 1.2 V may be different from each other. In this case, the amount of heat generated is extremely large and thus sequential voltage dropping, i.e., a step-down operation, may be performed as described above with reference to FIG. 3.

Alternatively, signals from the plurality of linear regulators may be provided to the CPU 212 of FIG. 2 for a monitoring operation and thus embodiments of the present disclosure are not particularly limited to any one form.

Conversely, the CPU 212 may be connected to each linear regulator to control an operation thereof.

As shown in FIG. 4, the clock generator 220 of FIG. 2 according to the embodiment of the present disclosure may include a plurality of clock generators, and each of the clock generators may be operated while connected to one of the plurality of elements 211 to 214.

The plurality of clock generators may be clock generators that generate femto-clocks (e.g., <500 femto sec) and may include a frequency generator, i.e., an oscillator. The plurality of clock generators may be operated under control of the CPU 212 of FIG. 2, and the CPU 212 may perform control operations of the plurality of clock generators. Each of the clock generators, i.e., femto-clock generators, may be used to generate femto-clocks of various frequencies in a frequency range of 10 MHz to 100 MHz to operate the elements 211 to 214. In FIG. 3, the plurality of femto-clock generators may not be connected in series unlike a plurality of linear regulators connected in series, but embodiments of the present disclosure are not particularly limited thereto.

Due to the above configuration, a clock with very high jitter quality may be supplied using a femto-clock and thus purposes such as high resolution, high sound quality, and high-precision control may be achieved in the fields of audio, medical, and military technologies.

In other words, according to an embodiment of the present disclosure, the demand for a music server that reflects changes in digital music playback media can be flexibly responded to, and problems such as degradation of sound quality due to noise in existing computers and a low-quality clock or during playback of sound between a computer and a network may be fixed.

A computer is basically using a bit perfect technique, but the quality of power and the quality of a clock are very important factors that affect work performed in real time. Therefore, such important factors can be enhanced according to embodiments of the present disclosure. Here, the bit perfect technique is a technique for reproducing a sound source so that a bit depth/sampling rate of the sound source may be the same as that of a device (e.g., a sound card or a digital-to-analog converter (DAC)) that outputs the sound source, and is one technique used to improve the quality of sound when music is listened to.

FIG. 5A illustrates a comparison between noise in the linear regulator of FIG. 3 and noise in a general SMPS regulator, and noise in the general SMPS regulator is 16.8 mV but noise in a linear regulator according to an embodiment of the present disclosure is 0.1 mV or less as illustrated in FIG. 5A.

FIG. 5B illustrates a result of comparison of distortion of a waveform, i.e., jitter, due to a clock. As shown in FIG. 5B, jitter, i.e., a delay of a clock, may occur when a general crystal clock is used. Due to this problem, synchronization may not be accurately performed. Accordingly, in an embodiment of the present disclosure, a high-precision femto-clock may be used and femto-clock generators may be provided to correspond to the elements 211 to 214, thereby reducing jitter. Here, the jitter is a value indicating a degree to which a signal occurs earlier or later than a reference point in time and indicates the difference between an ideal edge pointer and an actually measured waveform.

Figure 6:
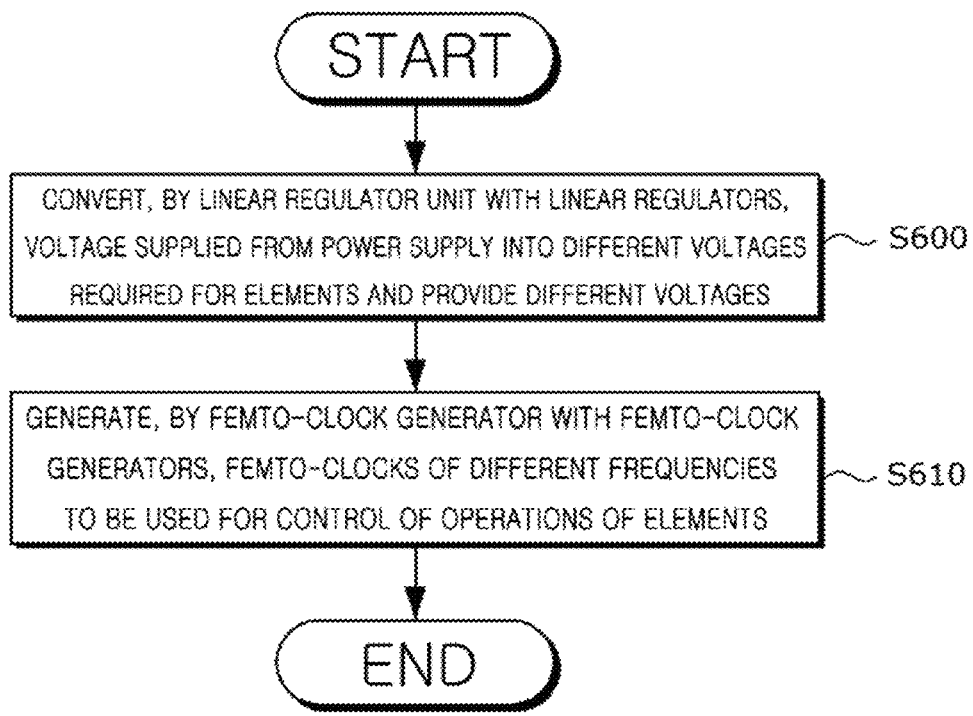
FIG. 6 is a flowchart of a driving process of the computing device of FIG. 1 according to an embodiment of the present disclosure.

FIG. 6 is a flowchart of a driving process of the computing device of FIG. 1 according to an embodiment of the present disclosure.

Referring to FIGS. 1 and 6 for convenience of description, in the computing device 100 of FIG. 1, a linear regulator unit with a plurality of linear regulators converts a voltage supplied from a power supply into different voltages required for a plurality of elements and provides the different voltages to the plurality of elements (S600). For example, when the number of different voltages used in the computing device 100 is ten, the number of the plurality of linear regulators may be ten. Alternatively, when ten elements such as IC chips use a power supply voltage Vcc, ten linear regulators corresponding to the ten elements may be configured on a main board. Alternatively, in the above configuration, when a plurality of elements use the same voltage, linear regulators may be configured to be used through a common connection, or different linear regulators may be used. Linear regulators may be configured in various forms according to a system designer's intention and thus are not limited to only one form in an embodiment of the present disclosure.

Next, in the computing device 100, a femto-clock generator with a plurality of femto-clock generators generates femto-clocks of different frequencies to be used for control of operations of a plurality of elements (S610). For example, clocks supplied to elements may be used for synchronization, and synchronization may be necessarily required for precision control.

The computing device 100 of FIG. 1 may perform various other operations, and these operations have been described above and thus redundant description is omitted.

According to an embodiment of the present disclosure, neighboring apparatuses are not negatively affected due to low noise, and a high-precision clock can be used to achieve high resolution, high sound quality, and an accurate control result when used in various fields of control.

In an embodiment of the present disclosure, a computer with high sound quality, which is capable of using not only audio data but also a general-purpose windows operating system (OS), can be manufactured and provided at a reasonable cost.

Although all components according to embodiments of the present disclosure are described as being combined together or operated in combination, the present disclosure should not be understood as being limited to the embodiments. That is, as long as the embodiment is within the scope of the present disclosure, at least one of all of the components may be selectively combined and operated. Each of the components may be implemented as one independent hardware component, or some or all of the components may be selectively combined and embodied as a computer program including program modules for performing some or all functions of a combination of one or more hardware components. Code and code segments of the computer program may be easily deduced by those of ordinary skill in the technical field of the present disclosure. The computer program may be stored in a non-transitory computer-readable medium and read and executed by a computer to implement an embodiment of the present disclosure.

Here, the non-transitory computer-readable medium should be understood to mean a medium capable of semi-permanently storing data and being readable by a device rather than a medium, such as a register, a cache, or a memory, which is capable of storing data only for a short time. Specifically, such programs may be stored in a non-transitory computer-readable recording medium such as a Compact Disc (CD), a Digital Versatile Disc (DVD), a hard disk, a Blu-ray disc, a USB, a memory card, a ROM, or the like.

While embodiments of the present disclosure have been illustrated and described herein, the present disclosure is not limited thereto and various modifications may be made therein by those of ordinary skill in the art without departing from the gist of the disclosure as claimed in the accompanying claims. These modifications should not be understood separately from the scope and spirit of the present disclosure.

What is claimed is:

1. A computing device with a main board including a plurality of elements, the computing device comprising:
   a linear regulator unit including a plurality of linear regulators configured to convert a voltage from a power supply into different voltages required for the plurality of elements and apply the different voltages; and
   a femto-clock generation unit including a plurality of femto-clock generators configured to generate femto-clocks of different frequencies to be used for control of operations of the plurality of elements,
   wherein the plurality of femto-clock generators are connected to a processor on the main board, and
   the processor controls the operations of the plurality of elements using the femto-clocks generated by the plurality of femto-clock generators.

2. The computing device of claim 1, wherein a fan having a heat dissipation function is not included due to the plurality of linear regulators and the plurality of femto-clock generators.

3. The computing device of claim 1, wherein the plurality of linear regulators are connected in series on the main board to sequentially reduce a voltage supplied from the power supply from one side to another side and provide resultant voltages to the plurality of elements.

4. The computing device of claim 1, wherein the number of the plurality of femto-clock generators is equal to the number of the plurality of elements, and each of the plurality of femto-clock generators is connected to one of the plurality of elements.

5. The computing device of claim 1, wherein the plurality of femto-clock generators generate clocks of different frequencies that are in a frequency range of less than 100 MHz.

6. A driving method of a computing device with a main board including a plurality of elements, the driving method comprising:
   converting, by a linear regulator unit with a plurality of linear regulators, a voltage from a power supply into different voltages required for the plurality of elements and providing the different voltages to the plurality of elements; and
   generating, by a femto-clock generation unit with a plurality of femto-clock generators, femto-clocks of different frequencies to be used for control of operations of the plurality of elements,
   wherein the plurality of femto-clock generators are connected to a processor on the main board, and
   the processor controls the operations of the plurality of elements using the femto-clocks generated by the plurality of femto-clock generators.

* * * * *